United States Patent [19]
Stauber

[11] 3,821,450
[45] June 28, 1974

[54] METHOD FOR ROASTING AND COOLING GRANULAR MATTER SUCH AS COFFEE

[75] Inventor: Siegfried Stauber, Zurich, Switzerland

[73] Assignee: Firma E. Osswald, Zurich, Switzerland

[22] Filed: July 12, 1971

[21] Appl. No.: 161,830

Related U.S. Application Data

[63] Continuation-in-part of Ser. No. 801,718, Feb. 24, 1969, abandoned.

[30] Foreign Application Priority Data

Feb. 29, 1968 Switzerland.......................... 2971/68

[52] U.S. Cl................................ 426/467, 426/469
[51] Int. Cl................................................. A23s 1/02
[58] Field of Search.............. 99/65, 68, 236; 34/10, 34/57; 55/345

[56] References Cited
UNITED STATES PATENTS

| | | | |
|---|---|---|---|
| 1,439,317 | 12/1922 | Maede | 99/236 |
| 2,212,120 | 8/1940 | Kneale et al. | 99/68 |
| 2,837,172 | 6/1958 | Klein et al. | 55/345 |
| 3,189,460 | 6/1965 | Smith, Jr. | 99/68 |
| 3,223,021 | 12/1965 | Osswald | 99/68 X |
| 3,399,998 | 9/1968 | Morrison | 99/68 |
| 3,503,136 | 3/1970 | Fleissner | 34/15 |

*Primary Examiner*—Frank W. Lutter
*Assistant Examiner*—William L. Mentlik
*Attorney, Agent, or Firm*—Werner W. Kleeman

[57] ABSTRACT

A method for roasting and cooling granular material, especially coffee beans, wherein a circulating gas stream is generated in a first closed system and the material to be roasted is also circulated by means of said circulating gas stream through said first closed system. The material is heated in the first closed system during its circulation therethrough, and the pressure within the first closed system is increased beyond atmospheric pressure by heating the circulating gas stream circulating the material to be roasted, heating of the circulating gas stream causing heating of the material and evolving gases from the heated material containing aroma constituents and primarily water vapor. The material is roasted in said first closed container system due to such heating thereof, with the increasing pressure within said first closed system being due to the heating of the circulating gas stream circulating the material and the attendent heating of the latter. Impurities lighter than the material roasted at said first closed system are separated, and upon completion of roasting the roasted material together with the gas stream containing the aroma constituents of the roasted material are transferred into a second closed system. The material and the gas stream are then cooled in said second closed system to relieve the pressure thereof.

4 Claims, 3 Drawing Figures

METHOD FOR ROASTING AND COOLING GRANULAR MATTER SUCH AS COFFEE

CROSS-REFERENCE TO RELATED CASE

This application is a continuation-in-part application of my commonly assigned, co-pending U.S. application, Ser. No. 801,718, filed Feb. 24, 1969, entitled: METHOD AND APPARATUS FOR ROASTING AND COOLING GRANULAR MATTER SUCH AS COFFEE and now abandoned.

BACKGROUND OF THE INVENTION

The present invention generally relates to the art of roasting and cooling of granular matter under pressure and particularly concerns a novel method of, and apparatus for, roasting and cooling such granular material, especially coffee.

The prior art is well familiar with various apparatus constructions and techniques for roasting granular material, especially coffee beans. Typical of these prior art installations and roasting techniques are U.S. Pat. No. 3,088,825 and U.S. Pat. No. 3,189,460.

These exemplary prior art constructions and procedures for the roasting of coffee operate in a manner which is thought not to afford the maximum advantages in carrying out coffee roasting operations and in providing the requisite safeguards for ensuring retention of the quality of the roasted product, particularly as concerns its aroma and flavor.

For instance, with the coffee roasting equipment as taught in U.S. Pat. No. 3,088,825 coffee, which is to be roasted, is delivered to feed hoppers and then such material moves through outlets and valves into preheaters. Here the coffee beans are preheated at atmospheric pressure and the preheated charge is then removed from the preheating area and transferred into a closed pressurized roasting zone or chamber in the form of a column. A separate pressurizing and heating fluid, such as steam, is admitted to the chamber via a supply pipe which similarly is controlled by a valve unit. The pressure which builds up within the roasting chamber is attributable to the infeed of the separate pressurizing and heating fluid. Upon completion of the roasting operation the roasted material is transferred into an expansion chamber, the transfer being relatively explosive-like owing to the sudden release of the pressure within the column. At the location of the expansion chamber the beans puff and gaseous materials are vented through a blower arrangement.

In U.S. Pat. No. 3,189,460 there is taught a roasting and heating technique, especially for roasting coffee. Here also, the prior art system disclosed therein and the coffee roasting technique taught by this patent utilizes a separate pressure source for building-up the pressure within the roasting chamber, and further, the gases which have evolved from the roasting operation are removed from the system prior to the time that the roasted material is transferred into a cooling unit.

Now it has been found that the use of a separate pressure source for the roasting chamber and the hardware which is associated therewith results in a much more complicated system, increasing the likelihood of breakdown and troublesome disturbances in operation. Furthermore, the utilization of systems which resort to the technique of providing a separate supply of pressurized medium into the roasting chamber must of necessity require increased power. Additionally, valuable aroma constituents are lost with such prior art techniques which ultimately impair the quality and flavor of the roasted product.

SUMMARY OF THE INVENTION

Therefore, it will be seen that the prior art is still in need of an effective method of, and apparatus for, roasting and cooling granular material, especially coffee, in a manner which is not associated with the aforementioned drawbacks of the prior art constructions. Hence, a primary object of this invention relates to the roasting and cooling of coffee in a manner so as to eliminate the problems which were present in the prior art while preserving the aroma during roasting.

Another and more specific object of the present invention relates to a novel method of roasting granular material, especially coffee, in a way that the requisite increase of the pressure within the treatment zone of the equipment for carrying out the roasting operation is undertaken through heating-up the circulating gas stream which serves to circulate the material throughout such treating zone and expansion of the moisture or water content of the material undergoing treatment.

Still a further significant object of this invention relates to an improved method of, and apparatus for, roasting coffee wherein the gases evolved during the roasting operation and which contain valuable aroma constituents are transferred collectively with the roasted coffee material into the cooling system for re-condensation and recombination with the coffee material.

Now, in keeping with the aforementioned objectives of this invention, there is taught a method of, and apparatus for, roasting and cooling granular material, especially coffee beans and the like. To this end, the equipment utilized in the practice of the method aspects of this development will be seen to embody a first closed system, sometimes conveniently referred to as a first closed container system, which is connected with a second closed system, also sometimes conveniently referred to as a second closed container system. The first closed system serves for the roasting of the material in the presence of a pressure increase beyond atmospheric pressure, and the second closed system serves to cool the roasted material, and the gases containing the aromatic or flavor constituents which evolve during the roasting operation. In the first closed system where the material is roasted the previously considered pressure increase is undertaken solely due to heat built-up existing therein, and specifically by heating the circulating gas stream which circulates the material to be roasted. Owing to this heating of the circulating gas stream the material is heated and gases evolve therefrom which contain primarily the evaporated moisture content in the form of water vapor as well as aroma constituents. Hence, as the material, the coffee beans for instance, are heated the water vapor evaporated into the circulating gas stream serves to promote the increased pressure conditions, thereby advantageously rendering it unnecessary to resort to a pressure built-up through the use of an external pressure source. The light impurities which may be present at the material are advantageously removed at the location of the first closed system. After the coffee beans or material has been roasted, such is transferred, and importantly, together with the gas stream containing the aromatic constituents, into the second closed system. At that location the roasted beans as well as the gas stream are cooled. Consequently, the valuable aromatic constituents of the gas stream are condensed and recombined with the coffee beans, thus preserving the important flavor characteristics and surprisingly also shelf-life of the product.

The invention also contemplates segregation of the heavy impurities at the location of the second closed system where cooling occurs. A further aspect of this invention is concerned with controlling the path of flight or movement of the coffee beans so as to maintain such flight path or trajectory as constant as possible, something of extreme significance owing to the considerable pressure increase within the system. In turn, this ensures for good segregation between the coffee beans and the skins or other impurities at the region of a cyclone provided for the first closed system.

BRIEF DESCRIPTION OF THE DRAWINGS

The invention itself as well as additional advantageous features and aspects thereof will become more readily apparent from the following detailed description of preferred inventive embodiments, such detailed description referring to the appended drawings, wherein.

DETAILED DESCRIPTION OF THE PREFERRED EMBODIMENTS

Figure 1:
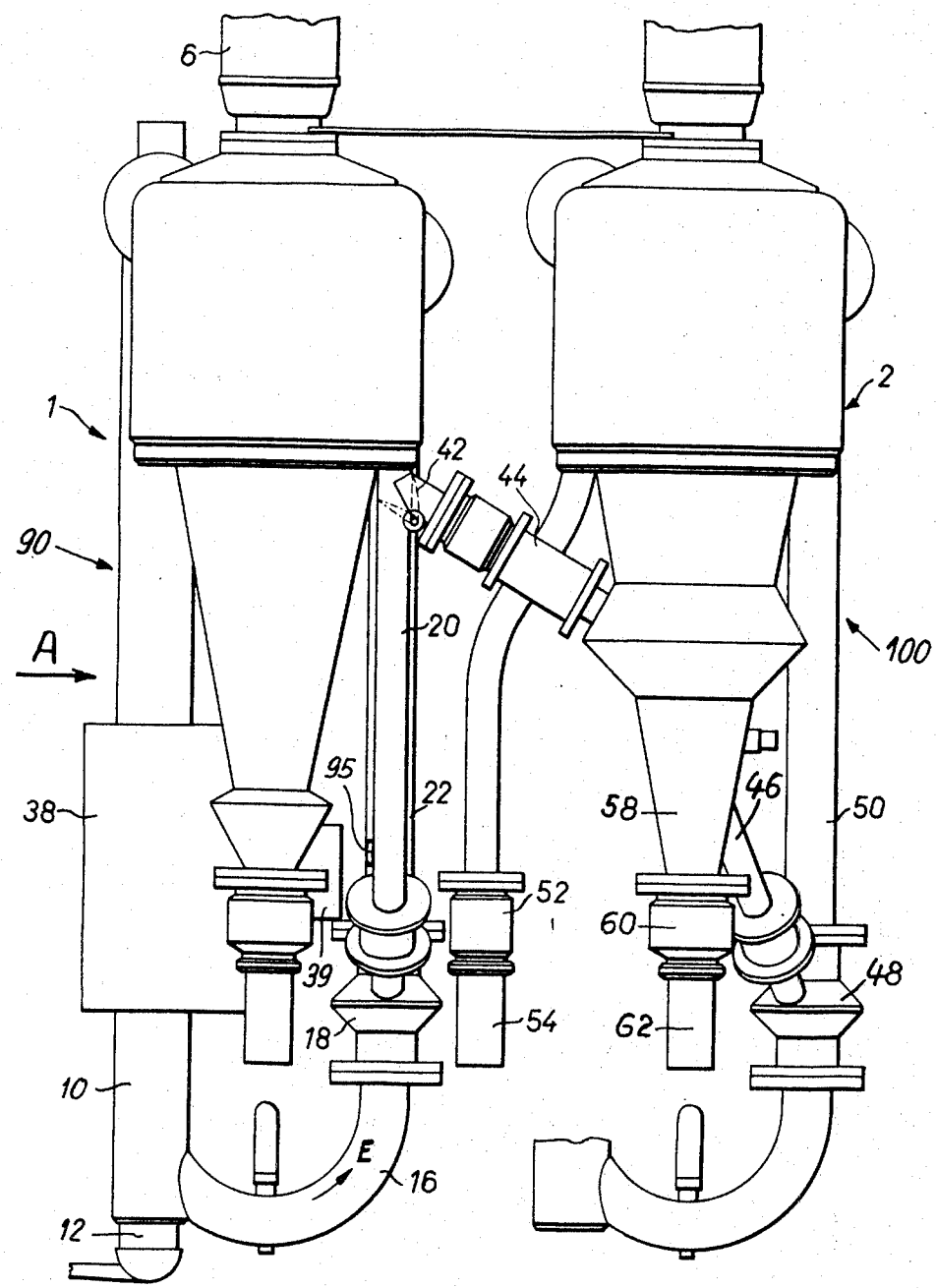
FIG. 1 depicts a side elevational view of the novel apparatus for roasting and cooling coffee.

Describing now the drawings, the apparatus illustrated therein is described, by way of illustration, with reference to its utilization in the roasting of coffee beans and the like. The novel apparatus embodies, what has been termed herein as a first closed system, generally referenced at 90, and a second closed system, generally referenced at 100. The first closed system 90 serves for the roasting og the coffee beans, while the second closed system 100 serves for cooling the roasted beans while recombining with the roasted material undergoing cooling the aroma constituents which have evolved during the roasting operation. As such, the first closed system 90 is in selective flow communication with the second closed system 100 for the purpose of transferring the roasted material, together with the gases containing the aroma constituents evolved during the roasting operation, into such second closed system 100, as will be more fully explained hereinafter. Further, each of these systems 90 and 100 are provided with a double cyclone 1 and 2, respectively, cyclone 1 serving for the roasting of the coffee beans, while cyclone 2 is utilized for cooling of the heated roast matter conjointly with the gases transferred from the first closed system into the second closed system. At the same time, light impurities are segregated from the coffee beans at the roasting cyclone 1, these light impurities comprising dust or snapped-off skins (so-called silver skins), said impurities generally adversely affecting the taste of the roasted product. The segregation of heavy impurities, such as stones, nails, or the like, for example, is contemplated to be undertaken at the cooling cyclone 2 of the second closed system 100.

Now the granular material, and specifically the coffee product, such as the green coffee beans which are to be roasted, is delivered into the novel apparatus and specifically into the first closed system 90 via a duct or conduit 3 equipped with a globe valve 4 or other suitable variety of closure valve disposed therein. Now, as best seen by referring to FIG. 2, this duct 3 merges with the interior of the cyclone 1 which is provided at its top region with a blower or fan 5 which can be controlled as regards its rotational speed through the agency of any suitable and therefore schematically illustrated control device 110 for purposes which will be more fully explained shortly. This blower 5 is driven by an electric motor 6 which, in turn, is controlled by the control device 110, and therefore the speed of revolution of the blower 5 can be controlled in an infinitely variable manner via such control means.

Now, the air which is conveyed by virtue of the rotation of the blower 5 is initially passed through a duct or conduit 7 which is in flow communication with the housing 112 of the cyclone unit 1. An air discharge channel 8 which communicates with this duct 7 is equipped with a globe valve 9 or equivalent valve unit which is normally closed. Therefore, the generated gas stream, namely the air current produced by the rotating blower 5, is forced to move through the duct 7 which, in turn, is in flow communication with a jacket duct 10 here shown extending in a substantially upright position. The air stream which has entered the interior of the jacket duct 10 flows downwardly in the direction of the arrow B shown in FIG. 2. Now, the jacket duct 10 which is of hollow construction is internally equipped with a combustion or heating duct 12, concentrically arranged therein and connected at its lower region to an oil burner unit 14 or any other suitable burner device. Thus, the arrangement is such that the heated gases within the heating duct 12 rise upwardly through this duct 12 in the direction of the arrow C illustrated in FIG. 2 and, in so doing, transfer heat through the walls of the heating duct 12 to the circulating gas stream, namely the air which is moving downwards along the outside of the walls of the heating duct 12 in the direction of the arrow B. Obviously then, the heating duct 12 will heat the air which is flowing within the jacket duct 10. Hence, the hot gases produced by the burner unit 14 which stream upwardly, in the direction of the arrow C, move in counter-flow to the air which is flowing downwardly, in the direction of the arrow B, within the jacket duct 10, and thus serve to heat this circulating air stream.

Figure 2:
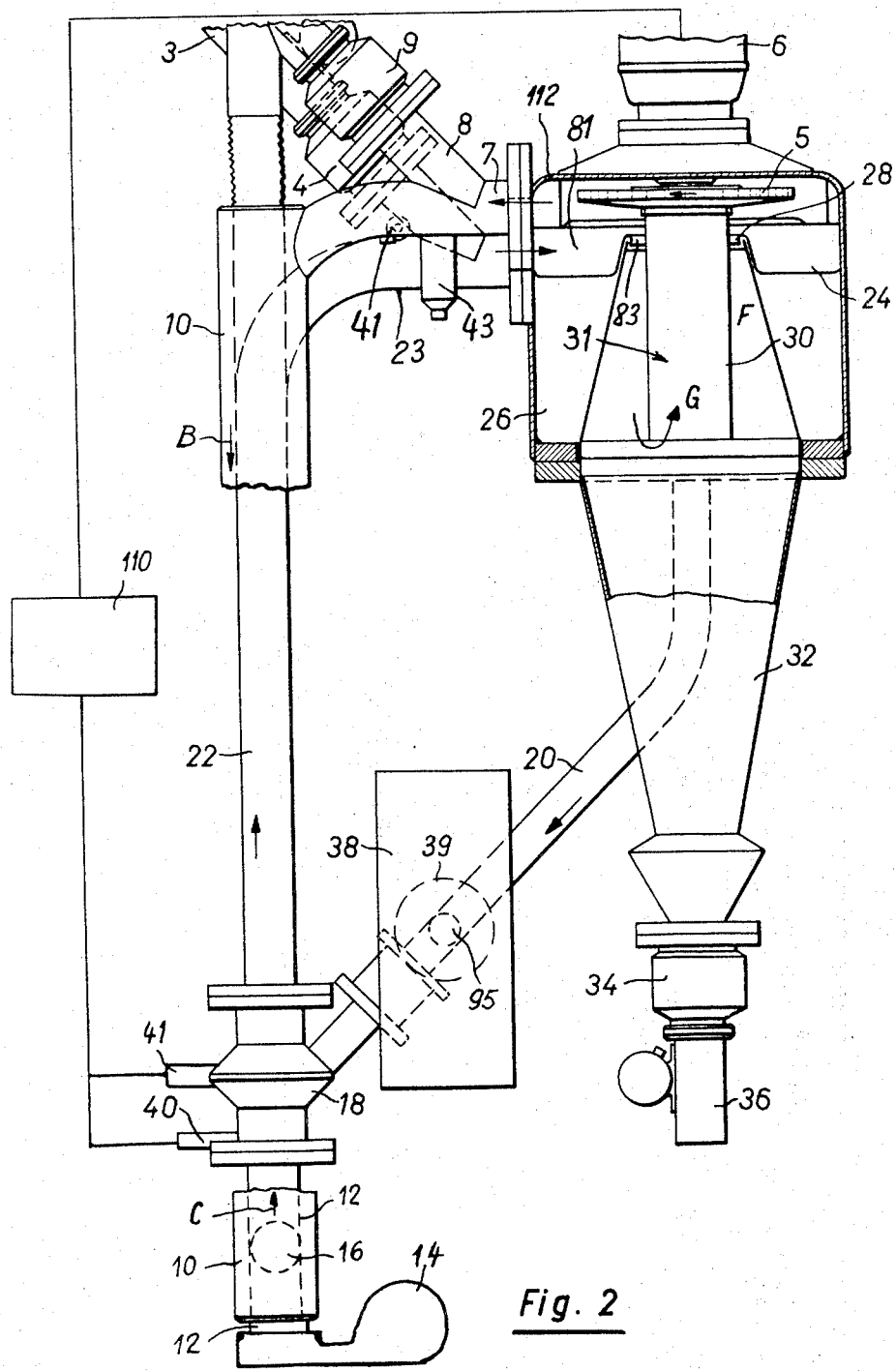
FIG. 2 depicts an elevational view, partially in cross-section, of the novel apparatus as viewed substantially in the direction of arrow A of FIG. 1.
Figure 3:
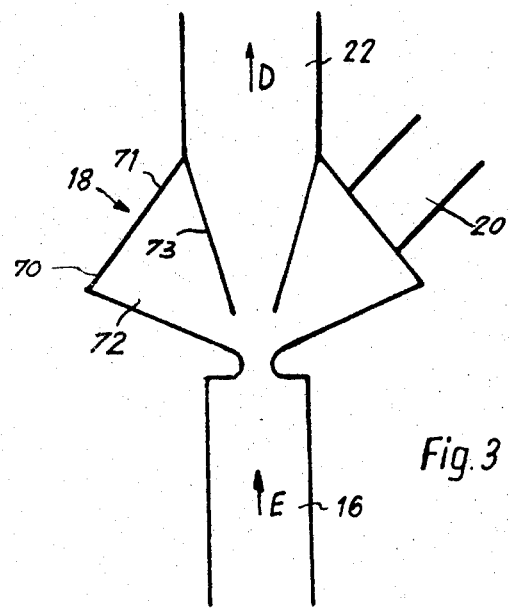
FIG. 3 is a fragmentary sectional view showing details of the construction of an injector used in the roasting apparatus of FIGS. 1 and 2.

Continuing, it will be seen that a branched pipe or knee duct 16 merges with the lower portion of the jacket duct 10 at a location above the burner unit 14. Hence, the now heated downwardly moving hot air stream departs from the lower region of the jacket duct 10 into the knee duct 16 to be moved upwardly through an arcuate path in the direction of the arrow E of FIG. 1. The knee duct 16 finally merges with an injector 18, the details of which have been best illustrated in FIG. 3. Prior to discussing such details it might here be conveniently remarked that the purpose of the injector 18 is to feed the coffee beans which are sliding downwardly out of the slanted pipe 20 which communicates with the tangential cyclone 24 of the cyclone unit 1 into the hot air stream such that the beans are forceably carried along by the gas stream flowing upwardly in the vertical pipe 22, which similarly communicates with the injector 18, so that the coffee beans are roasted in the vertical pipe 22 by the heated gas stream, namely the heated air. It will be seen from the showing of FIG. 1 that the vertical roasting pipe 22 is located to the right of the jacket duct 10, and therefore in the showing of FIG. 2 is situated behind such jacket duct 10 in spaced relationship therefrom.

In effect, then, the injector 18 provides a location where the hot gas stream entering the lower end of the injector 18 via the pipe 16 can contact the coffee beans which enter the injector 18 via the downwardly slanting pipe 20, and owing to the injector action produced within the injector 18 the circulating gas stream together with the coffee beans are expelled upwardly through the vertically rising pipe or conduit 22 which ultimately has its upper end in flow communication with the upper region of the housing 112 of the cyclone 1 at the location of the tangential cyclone 24 which will be discussed more fully shortly. It will be seen that the injector 18 possesses a housing 70 consisting of the cone-shaped portions 71 and 72, the knee duct 16 merging with the lower region of the cone-shaped housing portion 72 and the slanted pipe 20 and the vertical pipe 22 merging with the upper cone-shaped housing portion 71, as shown. Internally of the housing 70 the injector 18 is provided with conventional baffling, generally indicated at reference numeral 73 to produce the desired injector-like or ejector action.

Now the coffee beans which are forceably carried along by the hot air or gas which has entered via the knee duct 16 are then transferred via a knee pipe or duct 23 at the upper end of the vertical pipe 22, into the tangential cyclone 24. At this location the coffee beans are segregated from the skins which may have snapped-off and which were likewise forceably carried along by the rising air stream moving upwardly within the vertical pipe 22. The tangential cyclone 24 embodies a stationary substantially ring-shaped member 80 having a cylindrical channel 81 at the lower region of which there is provided at a convenient location of a portion of its circumference a conventional channel outlet or slide chute for the roasted coffee beans, this slide chute or outlet not being particularly shown in the drawings. The coffee beans departing from such channel outlet or chute slide into the downwardly slanting pipe 20. The skins which have been snapped-off the coffee beans as well as other impurities, such as dust or the like, are conveyed along with the circulating air stream over and past a rim portion 83 provided at the ring-shaped member 80 of the tangential cyclone 24, this rim portion forming a central annular slot 28. Hence, the circulating air stream together with the impurities move through this central annular slot 28 downwardly in axial direction, as indicated by reference character F, along the outer wall of a central vertical pipe 30, with the impurities finally depositing for the most part in the funnel-shaped axial cyclone 32. The collected impurities can be removed from time to time via a pipe extension by opening a suitable valve 34. On the other hand, the circulating air is drawn for the most part in the direction of the arrow G upwardly through the hollow central vertical pipe 30 by the action of the rotation of the blower 5, and this air is then recycled back via the duct 7 into the jacket duct 10 as previously explained. The coffee beans which have collected at the peripheral region of the tangential cyclone 24 slide into the slanted pipe 20 and continue their circulation in this fashion until the desired degree of roasting has been achieved. As a result of this circulation, the heating is uniform, and thus a uniform roasting process is ensured wherein the temperature of the interior of the system rises to approximately 300°C. The roasting process can be effectively supervised from the outside by an operating personnel through a looking glass 95 for instance associated with the slanted pipe 20, or else by means of a conventional colorimeter 38 equipped with an objective 39 which is operatively associated with pipe 20.

The roasting process described above takes place under pressure in a closed system, namely the first closed system 90, because the various inlet and outlet valves remain closed during such roasting process. As a result of heating of the air and the moisture expelled from the material in the interior of the first closed system 90, pressure builds-up and varies during the roasting process between 0 and about 24 atmospheres excess pressure. It will be understood from what has been explained above that this pressure build-up is not generated by an external pressure source, rather only by virtue of heating of the circulating gas stream circulating the material within the first closed system and the attendent heating of such material.

Now, in order to ensure for good segregation between the coffee beans and the skins or other impurities at the location of the tangential cyclone 24, it is necessary to control in variable fashion the output of the blower unit 5. To understand this more fully, it must be here mentioned that the specific weight of the circulated gas stream changes considerably depending upon the pressure, water content, and possibly the presence of the roast gases emanating from the roasted product itself in the interior of the system. On the other hand, the weight of the coffee beans also changes during the roasting process owing to the withdrawal of captured or entrained water and through volumetric change of the beans themselves. So as to make certain that the coffee beans which are forceably carried along by the gas stream or air for segregating the skins and the like in the interior of the tangential cyclone assume an exactly predetermined flight path it is necessary that such blower output be changed as a function of the pressure in the interior of the system. Now, it should be understood that the velocity of the conveying or circulating gas stream serves to properly convey the coffee beans into the tangential cyclone. In order to determine the exact manner in which this velocity is to be altered, it is necessary to measure the pressure which prevails in the closed system during the treatment. This pressure, of course, varies as a function of the roasting process which is undertaken, so that as roasting proceeds more of the volatile constituents and especially the moisture of the beans are expelled therefrom, thus in turn increasing the internal pressure of the first closed system. This change in pressure also is a function of the change in the weight of the beans due to their losing such moisture. Now recognizing that once it is possible to determine the weight of the beans at any point of time during the roasting process, it should be apparent that it is equally readily possible to calculate through the use of standard flow equations the velocity of the gas for its momentary pressure or density which is necessary to convey these beans into the cyclone. In other words, variations in the pressure of the first closed system provide an indirect measure for the weight of the beans, and that in turn provides a parameter for determining the minimum velocity of the gas flow to provide effective carrying or entrainment of the coffee beans into the cyclone 1 and along a predetermined path which thus can be maintained constant by selectively altering this gas flow velocity. Actual alteration in the gas flow velocity being perfected, as mentioned above, by varying the blower output, in other words, the rotational speed of the blower impeller as controlled by the blower motor 6.

From what has been expressed above, it should be apparent that it is not possible to provide an absolute rule as to how the rotational speed of the blower must be varied as a function of the pressure existing in the system for all situations which are encountered because it is necessary to take into account the coffee beans which are being processed at any given time in the system. In particular, however, one begins by determining for the type of beans which are being processed the initial moisture content of the beans, the initial size or volume of the beans and their starting weight. Then, one proceeds to process the beans by roasting same and determine the changes in size and weight of the beans at various points throughout the roasting process. It will here be again recalled that the change in size is due to the beans having given off a certain amount of their volatile constituents, primarily their moisture, which, in turn, influences the pressure conditions and consequently the density of the gas prevailing at any given moment in the closed system. Then, by having determined the weight of the beans at any given moment, and having measured the pressure existing in the system at such moment, it is possible to calculate the minimum velocity required of the gas stream to convey the beans together with the skins into the cyclone and to maintain such at a desired and constant flight path at the tangential cyclone 24. Now, when undertaking an actual run at the equipment, it is only necessary to measure the pressure which prevails in the system at any given time, because this in turn now provides an exact determination for the minimum gas velocity which must be achieved by controlling the blower so as to maintain such flight path constant or substantially constant. The control system 110 therefore can be designed such that for any given pressure measurement result, determined by the pressure measuring operation, the control system regulates the rotational speed of the blower 5 through the action of the blower motor 6, so that it will have a certain output and in turn a certain rotational speed of the blower impeller will be present, which should result in the aforesaid desired velocity of the gas stream to provide such constant flow path of the beans and the skins into the cyclone. This purpose is affected by a standard pressure measuring device 40 and preferably also by using a conventional pressure differential measuring device 41 for measuring the actual velocity of the gas stream, which devices 40 and 41 are operatively associated, for instance, with the first closed system, such as being arranged at the region of the injector 18, and owing to the measured pressure and/or pressure differential influences and controls via the control device 110 the speed of rotation of the electric motor 6 and therefore the rotational speed of the blower 5. The pressure measuring device 40 can be connected with the inlet side of the injector 18 to measure the pressure conditions prevailing at this location. On the other hand, the pressure differential device 41 is arranged preferably at the region of the injector 18 itself, to measure the pressure existing at two respective locations of the injector 18 possessing different cross-sectional areas of flow for the gas stream. This could be accomplished, for instance, by performing one pressure measuring operation at the inlet side of larger flow cross-section to the injector 18 and the other pressure measuring operation at the throat of narrowest flow cross-sectional area. It should be appreciated that the flow resistance of the system may change due to deposition of contaminants and other foreign materials therein. Also, the operating characteristic of the blower for different rotational speeds and pressure conditions in the system must be taken into account. Hence, by advantageously carrying out the pressure differential measurement it is possible to determine the actual flow velocity of the gas stream in the system, and to then compare such at the control device 110 with a reference value representative of the desired flow velocity. Upon non-coincidence of the actual gas velocity and reference or desired gas velocity a signal is transmitted by the control device 110 to the blower motor 6 for correspondingly adjusting the rotational speed of the blower 5 so as to attain the desired gas velocity, in order to maintain the flight path of the beans as nearly constant as possible.

The control device 110 may be constituted by electrical, pneumatic, hydraulic or mechanical components. Furthermore, the change in the blower output could also be accomplished in a mechanical fashion by adjusting the pitch or position of the impeller or rotor blades. Finally, it is here mentioned by way of completeness that a similar pressure measuring and control arrangement could be likewise provided for the second closed system 100.

The blower output is controlled in such a fashion that a constant flight path in the tangential cyclone is obtained insofar as possible, this control resulting in an extremely good segregation of the impurities which are lighter than the coffee beans from the beans themselves.

Continuing, it will be seen that a measuring member or means 41' measures the humidity of the air in the interior of the system and, if required, water or other suitable liquids are injected through a nozzle 43 or the like or, alternatively, liquid is condensed out of the system through cooling of a condensation pot. After completion of the roasting process, a control flap 42 is reversed, such reversal being effected either manually or controlled by colorimeter 38 which supervises the color of the coffee beans. On the one hand, this flap 42 closes duct 20, and, on the other hand, such flap 42 serves to open a duct 44 which merges into cooling cyclone 2 of the second closed system 100.

The coffee beans which have now been roasted to completion are transferred via a connecting pipe 44 into the interior of the cooling cyclone 2 and are therein cooled. In the lower portion of cooling cyclone 2, a flap is provided which has not been particularly illustrated in the drawings, such flap initially being set such that the coffee beans are transferred into duct 46 from connecting pipe 44 and therein are taken into the injector 48. Injector 48 is constructed in a similar fashion as injector 18.

The coffee beans are now forceably carried upwardly by a cool air stream in the interior of pipe 50 and, when the beans reach the top, they are taken by a knee pipe into a tangential separator, which may be similar to tangential cyclone 24, in which segregation takes place between the coffee beans and heavy impurities such as stones, nails and the like, such impurities also being heavier than coffee beans and therefore not removable in the first cyclone. The mode of operation of the cooling cyclone 2 is similar to that of the cyclone unit 1 and especially the tangential cyclone 24 thereof. After completion of the cooling process, a globe valve 60 or the like provided at the lower end of the funnel 58 is opened and the roasted and now cooled matter can be discharged through an outlet extension 62. The segregated heavy impurities such as stones, nails and the like, can be removed through a pipe extension 54 by opening valve 52. Instead of determining the roast or roasting time of the coffee beans by means of a colorimeter, as above explained, flap 42 can be reversed in a purely time-dependent fashion under the control of any standard time measuring device.

Depending upon the particular user's requirements, the roasting and/or cooling system can be evacuated at a definite point of time by means of a vacuum pump and, additionally, an inert gas, a protective gas, or a purification or enriching gas can be introduced, if desired.

Heating of the system can take place also by means of gas, oil, or electricity. Cooling can be effected with air, water, or other coolants associated with a refrigerating machine. The feeding speed of the product to the injectors can also be controlled by means of throttles and the like.

As should further be apparent, the entire inventive installation can be constructed such that automatic roasting and/or cooling may be effected through the employment of punch cards, insert cards, and the like, serving to feed desired ideal values into the installation.

While there is shown and described present preferred embodiments of the invention, it is to be distinctly understood that the invention is not limited thereto but may be otherwise variously embodied and practiced within the scope of the following claims.

Accordingly, what is claimed is:

1. A method for roasting and cooling granular material, especially coffee beans, comprising the steps of:
   a. generating a circulating gas stream in a first closed system;
   b. circulating the material to be roasted by means of said circulating gas stream through said first closed system;
   c. heating the material in the first closed system during its circulation therethrough;
   d. increasing the pressure within the first closed system beyond atmospheric pressure only by heating the circulating gas stream circulating the material to be roasted, heating of the circulating gas stream causing heating of the material and evolving gases containing water vapor and aroma constituents from the heated material;
   e. roasting the material in said first closed container system due to such heating thereof, with the increasing pressure within said first closed system due solely to the heating of the circulating gas stream circulating the material and the attendant heating of the latter;
   f. centrifugally separating impurities lighter than the material being roasted at said first closed system;
   g. upon completion of roasting of such material transferring the roasted material together with the gas stream containing the aroma constituents of the roasted material into a second closed system;
   h. cooling the material and the gas stream in said second closed system to relieve the pressure thereof; and
   i. regulating the gas velocity of the gas stream in order to control the flight path of the solid constituents entrained by the gas stream so as to be substantially constant as to its trajectory.

2. The method as defined in claim 1, including the step of separating impurities from the gas stream which are heavier than the roasted material in the second closed system.

3. The method as defined in claim 1, further including the step of controlling the velocity of the gas stream as a function of the specific weight of the gas stream and the pressure differential of the gas stream within the interior of said first closed system.

4. A method for roasting and cooling green coffee beans, comprising the steps of:
   a. generating a circulating gas stream in a first closed system;
   b. circulating the green coffee beans to be roasted by means of said circulating gas stream through said first closed system;
   c. heating the green coffee beans in the first closed system during its circulation therethrough;
   d. increasing the pressure within the first closed system beyond atmospheric pressure only by heating circulating gas stream circulating the green coffee beans to be roasted, heating of the circulating gas stream in turn causing heating of the green coffee beans and evolving gases therefrom containing aroma constituents;
   e. roasting the green coffee beans in said first closed system due to heating thereof with the increasing pressure within said first closed system due solely to the heating of the circulating gas stream and the thereby circulated green coffee beans;
   f. centrifugally separating impurities lighter than the green coffee beans being roasted at said first closed system;
   g. upon completion of roasting of the green coffee beans transferring the roasted beans together with the gas stream containing the aroma constituents into a second closed system;
   h. cooling the roasted beans and the gas stream in said second closed system to relieve the pressure thereof;
   i. condensing the aroma constituents of the gas stream due to the cooling thereof in said second closed system;
   j. recombining the condensed aroma constituents with the roasted beans, to preserve the flavor thereof; and
   k. regulating the gas velocity of the gas stream in order to control the flight path of the solid constituents entrained by the gas stream so as to be substantially constant as to its trajectory.

* * * * *